(12) United States Patent
Riman et al.

(10) Patent No.: US 7,022,303 B2
(45) Date of Patent: Apr. 4, 2006

(54) SINGLE-CRYSTAL-LIKE MATERIALS

(75) Inventors: Richard E. Riman, Belle Mead, NJ (US); Larry E. McCandlish, Highland Park, NJ (US)

(73) Assignee: Rutgers, The State University, New Brunswick, NJ (US)

(*) Notice: Subject to any disclaimer, the term of this patent is extended or adjusted under 35 U.S.C. 154(b) by 326 days.

(21) Appl. No.: 10/145,372

(22) Filed: May 13, 2002

(65) Prior Publication Data

US 2003/0211369 A1 Nov. 13, 2003

(51) Int. Cl.
*C01G 49/00* (2006.01)

(52) U.S. Cl. ............... 423/594.9; 423/598; 423/594.1; 423/625; 423/263; 423/622; 423/409; 423/566.1; 423/610; 423/490; 428/323; 428/702; 420/83; 420/435

(58) Field of Classification Search ............. 423/594.9, 423/598, 594.1, 625, 263, 622, 409, 566.1, 423/610, 490; 428/702, 323; 420/83, 435
See application file for complete search history.

(56) References Cited

U.S. PATENT DOCUMENTS

| | | | |
|---|---|---|---|
| 3,967,355 A | 7/1976 | Giamei et al. | 29/194 |
| 4,475,980 A | 10/1984 | Rhemer et al. | 156/603 |
| 4,961,818 A | 10/1990 | Benn | 456/603 |
| 5,441,803 A | 8/1995 | Meissner | 428/220 |
| 6,048,394 A | 4/2000 | Harmer et al. | 117/8 |
| 6,180,226 B1 | 1/2001 | McArdle et al. | 428/332 |

OTHER PUBLICATIONS

Terfort, Andreas, et al., Three-dimensional self-assembly of millimetre-scale components, *Nature*, vol. 386, pp. 162-163 (Mar. 13, 1997).
Breen, Tricia L., et al., "Design and Self-Assembly of Open, Regular, 3D Mesostructures," *Science*, vol. 284, pp. 948-951 (May 7, 1999).
Bowden, Ned, et al., "Self()Assemby of Mesoscale Objects into Ordered Two-Dimensional Arrays," *Science*, vol. 276, pp. 233-234 (Apr. 11, 1997).
International Search Report for PCT/US03/115226, issued Aug. 4, 2003.

*Primary Examiner*—Steven Bos
(74) *Attorney, Agent, or Firm*—Synnestvedt & Lechner LLP

(57) ABSTRACT

Polycrystalline materials of macroscopic size exhibiting Single-Crystal-Like properties are formed from a plurality of Single-Crystal Particles, having Self-Aligning morphologies and optionally ling morphology, bonded together and aligned along at least one, and up to three, crystallographic directions.

37 Claims, 2 Drawing Sheets

SINGLE-CRYSTAL-LIKE MATERIALS

BACKGROUND OF THE INVENTION

The present invention relates to polycrystalline materials having Single-Crystal-Like properties, in which a plurality of Single-Crystal Particles are assembled together with their crystallographic axes aligned in at least one, but also possibly in two or three dimensions. The present invention also relates to methods for forming the polycrystalline materials of the present invention.

Single crystal materials have applications in mechanical, electronic, electromechanical, optical and magnetic devices. However, the growth and processing of large single crystals is difficult, time-consuming and expensive. The growth of ceramic single crystals from high temperature melt or liquid solution often require expensive and energy consuming furnaces. The required melt or liquid solution is contained by crucibles often consisting of expensive precious metals such as Pt or Pd. Single crystals must be cooled from their growth temperatures, and can be damaged upon cooling by stresses induced by a variety of factors such as polymorphic phase transformation or anisotropic contraction of the lattice. Stresses can induce cracks or significant changes in crystal properties. These induced stresses can make it difficult, if not impossible, to manufacture useful crystals in large sizes. Other problems associated with high temperature crystal growth arise from phenomena that alter the composition of the crystal such as volatility of one or more of the components and incongruent melting behavior. In addition, molten solvents can introduce impurities into the crystal that cannot be eliminated by conventional purification processes.

Single crystals are typically grown as large boules. These boules are processed by cutting, dicing and polishing prior to incorporation into a device. These steps are time-consuming and may introduce defects. The size of the finished crystal is limited by the processing operation. A lower limit in size of hundreds of microns is typical. The upper size limit is governed by the size and quality of the crystal boule. The size varies greatly with composition. For example, Si can be grown up to a diameter of about 10 inches, while the diameter of YIG may be only on the order of 0.5 inch.

Furthermore, single crystals have lower fracture toughness than their polycrystalline counterparts. Thus, single crystals can be extremely brittle, and their strength can be greatly diminished with surface damage (e.g., scratches) and this diminishes their reliability for many types of applications.

There exists a need for low cost materials with performance properties comparable to single crystals yet which overcome the limitations of single crystals described above.

SUMMARY OF THE INVENTION

This need is met by the present invention. A cost-effective method of fabricating polycrystalline single phase and composite materials has been developed that addresses the deficiencies of single crystals while capturing some, if not all of the performance advantages. The present invention takes Single-Crystal Particles and packs and aligns them with respect to one, two or three dimensions to form a polycrystalline microstructure that for all practical purposes captures the performance of at least one important property of a large single crystal.

Therefore, according to one aspect of the present invention, a polycrystalline material is provided in which a plurality of Single-Crystal Particles having self-orientation are bonded together to fix their orientation along at least one crystallographic direction. The particles interact with one another or with a substrate surface to align their crystallographic axes in one, two or three dimensions. The preferred degree of alignment will depend on the device application for the material. For purposes of alignment, it is essential that the particles have uniform shapes with dominant planar surfaces in a suitable orientation, preferably perpendicular to or parallel to, with respect to the desired direction of alignment.

According to one embodiment of this aspect of the invention, the polycrystalline materials comprise a plurality of Single-Crystal seed Particles aligned in at least one direction, in which the voids therebetween have been filled with a nutrient matrix of nanoparticles of the same or different material and heated at a temperature sufficient to induce solid state diffusion until the nanoparticles bond together adjacent Single-Crystal Particles. Preferably, this embodiment is heated at a temperature sufficient to induce grain boundary mobility, so that the Single-Crystal Particles grow by consumption of the nanoparticles until impingement of adjacent crystal grain boundaries prevent further growth. The net result is a polycrystalline microstructure, the grains of which for all practical purposes are aligned in one, two or three dimensions so that it performs like a single crystal with respect to some desired property.

According to one preferred embodiment of this aspect of the invention, cube-shaped Single-Crystal Particles are packed and aligned with respect to one, two or three dimensions to form a polycrystalline microstructure that for all practical purposes captures the performance of at least one important property of a large single crystal. According to this preferred embodiment of this aspect of the invention, the cube-shaped Single-Crystal Particles are bonded together by filling the voids with nanoparticles, after which the filled array is heated to at least a temperature sufficient to induce solid state diffusion between the nanoparticles and the crystal particles until the nanoparticles bond together adjacent Single-Crystal Particles. According to an even more preferred embodiment, the temperature of the heating step is sufficient to induce grain boundary mobility, so that the cube-shaped Single-Crystal Particles grow by consumption of the nanoparticles until impingement of the grain boundaries of adjacent single crystal regions occurs.

According to another preferred embodiment of the present invention, the polycrystalline materials comprise a plurality of Single-Crystal Particles that are aligned in at least one crystallographic direction and bonded together by a polymer phase. This embodiment of the present invention incorporates the discovery that aligned Single-Crystal Particles produce a net Single-Crystal-Like behavior, even when the particles are bonded together by a non-ceramic material without impingement of the Single-Crystal Particle surfaces. Accordingly, essentially any thermoplastic or thermosetting polymer is suitable for use with this embodiment of the present invention.

For example, applying an oscillating electric field across a polymer-ceramic composite consisting of an aligned array of piezoelectric Single-Crystal Particles causes each individual crystalline particle to generate an acoustic wave, which combines with waves from other particles to form a net acoustic wave characteristic of a single crystal having the same size as the array. It is the particle alignment that produces the net Single-Crystal-Like behavior. This embodiment of the invention thus provides a polymer-bonded Single-Crystal-Particle composite material with Single- Crystal-Like properties, which does not require the high temperature steps necessary for making a ceramic single crystal.

The present invention also includes all methods by which the polycrystalline materials of the present invention are made.

The polycrystalline Single-Crystal-Like composite materials of the present invention, are suitable for many applications where a single crystal would be useful. Accordingly, the present invention also includes mechanical, electronic, electromechanical, optical and magnetic devices incorporating the Single-Crystal-Like polycrystalline materials of the present invention. The polycrystalline materials of the present invention are particularly useful in the preparation of piezoelectric devices, which are included among the electromechanical devices of the present invention.

It is conceivable that the present invention could be utilized for the purposes of making a structural material, where the mechanical properties alone sufficiently justify its utility. Thus, in one preferred embodiment of this invention, a highly filled polymer-ceramic composite consists of aligned ceramic cubes in a low volume fraction matrix of organic polymer. In another preferred embodiment, a high volume fraction of ceramic single crystal cube-shaped particles are dispersed in a low volume fraction of non-aligned fine grains of the same ceramic composition. This invention takes advantage of the higher fracture toughness that polycrystalline textured materials have in comparison to their single crystal counterparts. Accordingly, the polycrystalline Single-Crystal-Like materials of the present invention are much more mechanically durable than comparable single crystals of the prior art. Thus, the present invention also provides materials having the functional electrical and optical properties of single crystals but which can also endure mechanical shock, vibration, and the like. Further features and advantages of the invention will become more readily apparent from the following detailed description when taken in conjunction with the accompanying drawings.

DETAILED DESCRIPTION OF THE PREFERRED EMBODIMENTS

Figure 1:
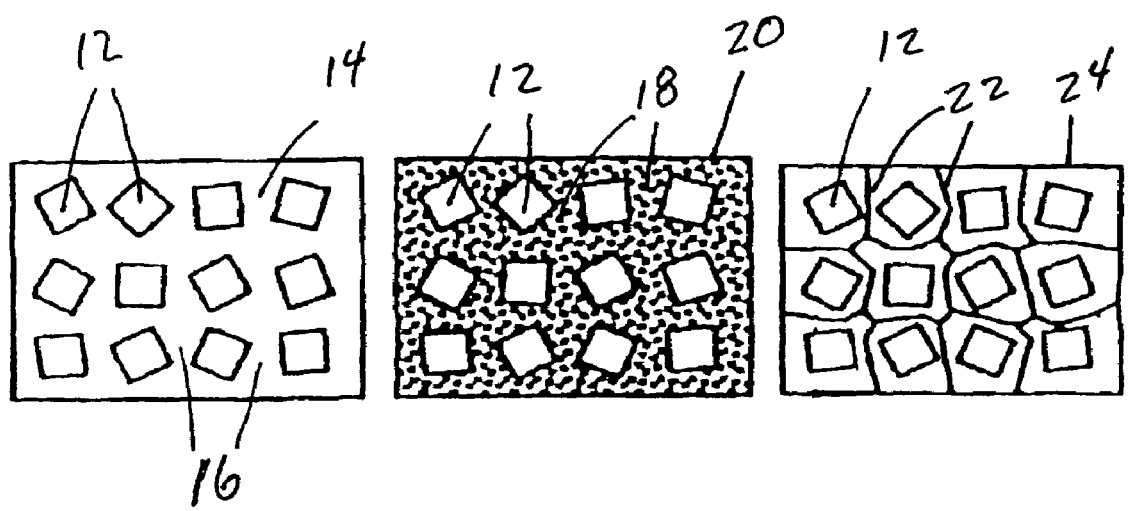
FIG. 1 Depicts the preparation of a polycrystalline composite material according to one embodiment of the present invention in which the individual cube-shaped Single-Crystal Particles are aligned in one crystallographic direction.

For the purposes of the present invention, "Single-Crystal Particles" are defined as single crystals with controlled size on a size scale of fractions of a millimeter or less and controlled morphology where all the particles have essentially the same shape or habit. Furthermore, for purposes of the present invention, the term "Single-Crystal Particle" also includes polycrystalline agglomerates having low-angle grain boundaries between the individual single-crystal grains of the agglomerate, such that the polycrystalline agglomerate exhibits essentially single crystal behavior. Perfect Single-Crystal Particles are nevertheless preferred. By controlled morphology, we mean that the Single-Crystal Particles have a single large (dominant) crystal face in a suitable orientation, preferably perpendicular to or parallel to, with respect to the desired direction of alignment. More than one large crystal face is acceptable, provided that these faces are symmetrically equivalent. In certain circumstances, more than one crystallographic direction would be acceptable, thus, in this case, a mixture of crystals having the desired dominant crystal faces would be acceptable. In the case, where there is no dominant crystal face, such as in a cylindrical single crystal fiber, then the required dominant direction is along the length of the fiber and this must also be the desired direction of alignment.

Single crystals are defined as macroscopic crystals that are inches, centimeters, or many millimeters in size. "Single-Crystal-Like" materials are aligned arrays of Single-Crystal Particles whose positions and orientation are fixed by bonding to a substrate and/or embedding in a polymer, metallic or ceramic matrix. A reactive embedding matrix can consist of nutrient that allows the Single-Crystal Particles to be grown to a larger size. Alternatively, the embedding matrix can be inert and only bond the Single-Crystal Particles together. All of the above mentioned Single-Crystal-Like materials can also be referred to as textured materials. The embedding matrix can play a functional (e.g., optical, electrical, magnetic) and/or structural role in influencing the materials properties.

The Single-Crystal Particles of the present invention have at least "Self-Aligning" morphologies, which may also be highly "Space Filling." For purposes of the present invention, "Self-Aligning" morphologies are defined as including any particles that are capable of self-organizing to form a polycrystalline structure wherein the Single-Crystal Particles are aligned along at least one crystallographic direction so that the particles perform collectively like a monolithic single crystal. If the particle morphology permits the packing of particles at higher volume fractions than normally encountered for randomly oriented and packed equiaxed particles, then these morphologies are also "Space Filling". Volume fractions typically encountered for equiaxed randomly oriented and packed particles correspond to a value of about 0.65 or less. The present invention in a particular embodiment, where cube-shaped particles are aligned and packed can produce packing fractions that approach 1.0 when 3-dimensional alignment is achieved. There are numerous systems with Single-Crystal Particle morphologies that offer both Self-Aligning and Space-Filling morphologies. Examples of Single-Crystal Particle morphologies with Self-Aligning Space-Filling morphologies include cubic particles, hexagonal platelets, hexagonal fibers, rectangular platelets, rectangular particles, octahedral particles, and the like.

Certain Self-Aligning Space-Filling morphologies provide reliable self-alignment in one direction, so that when the particles sit on a surface, at a minimum they align with at least one common crystallographic direction. For example, cubes can align along the <001>-direction yet be randomized with respect to the <010>- and <100>-directions. Platelets and fibers will align similarly. Cubes can also align perfectly with respect to all three crystallographic axes. Fibers cannot align in all three directions if they have a round cross-section, but can if their cross-section occupies a two dimensional Space-Filling geometry such as a square, rectangle or hexagon. Platelets can align in three dimensions if their morphology is uniform with respect to 3 dimensions. For instance, a hexagonal platelet can align in 3 dimensions, provided it has sufficient thickness to prevent platelets from overlapping. However, regardless of the thickness, a round platelet cannot align in 3 dimensions.

There are many applications where precise self-alignment is not important. For example, Self-Aligning morphologies may establish a preferred orientation that could be 10 degrees from the desired alignment direction, yet still sufficiently capture the desired properties of a single crystal. Thus, particles having such morphologies include particles that essentially have the desired morphology. For instance, for particles that are cubes, the particles need not be perfect cubes. The axes need not be at perfect 90 degree angles, nor exactly equal in length. Corners may also be cut off of the particles. Furthermore, "cube" or "cubic" is intended to refer to morphology, and is not intended to limit the particles to cubic crystal systems. Instead, Single-Crystal Particles that have orthorhombic, tetragonal or rhombohedral crystal structure may also be employed as cubes if they possess the defined cubic morphology. In other words, any essentially orthogonal Single-Crystal Particles in which the faces are essentially square, essentially rectangular, or both, that possess an essentially cubic morphology are considered cubes for purposes of the present invention.

The use of Self-Aligning Space-Filling single-crystal particles for monolithic structures can consist of a single layer of crystals. In addition, Single-Crystal-Like materials can also consist of multiple layers of crystals as well. The layer or layers can be conformal to curved surfaces, layers can be deposited on surfaces of complex geometry, and layers can be wound into complex geometries such as spirals, circles, ellipses.

Single-Crystal Particles suitable for use with the present invention are materials whose properties are strongly dependent on crystallographic direction, which are also known as Vector properties or more generally Tensor properties. Examples of Tensor properties include mechanical, electronic, electromechanical, optical and magnetic properties. For electromechanical single-crystal end-uses, including piezoelectric uses, exemplary compounds include lead zirconate titanate (PZT) compounds having the formula $Pb(Zr_xTi_{1-x})O_3$ with a perovskite structure wherein $0.20<x<0.80$, with x preferably being greater than about 0.52, and other materials with perovskite structure and properties that depend on crystallographic direction, such as lead zinc niobate doped with lead titanate, lead magnesium niobate doped with lead titanate, sodium potassium bismuth titanate doped with barium and zirconium, bismuth ferrite doped with lead titanate, and the like. PZT piezoelectric compounds are particularly preferred.

Optical Single-Crystal Particle compounds include doped alumina (sapphire), yttrium aluminum garnets (YAG), yttrium iron garnets (YIG), lead lanthanum zirconate titanate (PLZT), zinc oxide, rhodium doped barium titanate, gallium nitride, cadmium sulphide, titania, calcium fluoride, rare earth doped lanthanum chlorides, rare earth doped lanthanum fluorides, yttrium orthophosphate, terbium phosphate, and the like. Magnetic single crystal compounds include manganese zinc ferrite, strontium ferrite, barium ferrite, yttrium iron garnet, samarium cobalt alloys, neodymium-iron-boron alloys and the like.

In one embodiment of the present invention, the Single-Crystal Particles are grown to a larger size so that the entire microstructure consists of aligned Single-Crystal Particles. The Single-Crystal Particles are considered "seeds" if they are grown to a larger size via solid state or liquid phase sintering. In order to grow the seeds larger, there must always be a substantial size difference between the nutrient particles and the Single-Crystal Particles. The Single-Crystal Particles are much larger than the nanoparticles of the nutrient matrix, which are less than one micron in size and preferably less than 0.1 micron in size. This size difference enables the Single-Crystal Particles to grow at the expense of the nutrient particles. If the nutrient matrix nanoparticles and the Single-Crystal Particles were comparable in size, then growth of the Single-Crystal Particles would not consume the nutrient matrix and the fraction of aligned material would not be increased.

The Single-Crystal-Like polycrystalline materials of the present invention are prepared by packing and aligning a plurality of Single-Crystal Particles into an aligned array, and then bonding the particles together. Packing and aligning can be done in many ways. There are physical methods such as the use of screens and micromolds, which provide a mechanism to achieve one, two and three-dimensional alignment. These methods use a physical template, wherein Single-Crystal Particles can be passed through an opening of comparable dimension and having a controlled shape to precisely position and align the particles. The particles can be settled onto an adhesive-coated surface that secures the particles thereto upon contact of the dominant face of the Single-Crystal Particle with the adhesive.

A simpler approach settles the particles on a flat surface, thereby aligning the particles one-dimensionally perpendicular to the surface. In this case, the crystallographic alignment of the particles is randomized in the plane of the substrate and the alignment is one dimensional. For some systems such as piezocrystals, this is all that is necessary in order to get the required Single-Crystal-Like performance from the polycrystalline materials of the present invention. Three-dimensional alignment, however, maximizes the capture of Single-Crystal-Like properties.

Other packing and aligning methods include self-assembly methods. Suspensions of Single-Crystal Particles are processed at volume fractions of about 10 to about 99% in a liquid. High volume fractions are preferred, i.e., about 50% or greater. The suspension is lightly agitated to increase packing density and to order the Single-Crystal Particles. The liquid is then decanted and the structure is dried. As drying proceeds, surface tensional forces, which arise during drying, further consolidate the Single-Crystal Particles using the dominant crystal faces to align their orientations with one another.

Another approach uses two immiscible liquids. One fluid is mixed with the micro-Single-Crystal Particles and poured onto another immiscible fluid. As the upper fluid dries, the surface tension of the upper fluid draws the particles together using the immiscible lower fluid as a lubricating surface so the particles can freely rearrange by rotation and translation. Non-wetting metals (e.g., gallium, mercury, and the like) with low melting points can be used to support particles, so that the particles can rearrange on the liquid metal surface. An immiscible fluid phase that wets the particles but does not react with the underlying metal layer can then be used to draw the particles together using the dominant crystal faces of the Single-Crystal Particles for forming a consolidated, dense, aligned structure.

Another approach is to coat the seed crystals with wax in a manner such that each crystal is unagglomerated. The wax-coated single-crystal-particles can be mixed with water to make a suspension that can be poured onto a heated surface. When the water/wax-coated-Single-Crystal Particle suspension becomes hot, the wax layer become molten and serves to bond the dominant crystal faces of the particles together as they approach one another.

Electrostatic or magnetic forces may also be used to align the Single-Crystal Particles. Essentially any means by which alignment of the particles can be obtained is suitable for use with the present invention.

There are also many methods suitable for bonding together an array of Single-Crystal Particles. For example, the voids of a particle array can be filled with a nanoparticle suspension by casting the suspension on top of the array. Single-Crystal Particles can also be co-mixed with nanoparticles using a high volume fraction of Single-Crystal Particles and a smaller fraction of nanoparticles that act as a lubricating and binding phase that helps the Single-Crystal Particle ensemble organize while maintaining adhesion between the Single-Crystal Particles.

Single-Crystal Particles of the foregoing compounds are prepared by essentially conventional means, such as by precipitation from molten salt solvent or hydrothermal solutions, microwave-hydrothermal synthesis, vapor phase synthesis, aqueous precipitation, precipitation from homogeneous solution, sonochemistry, spray pyrolysis, biomemitic processing, emulsion processing, microemulsion processing, plasma synthesis, and the like. The particles are then aligned as described above, and bonded together, either by filling the voids therebetween with nanoparticles of the same or different material or polymer, and then heating the composite structure. The nanoparticles are prepared by physical grinding, by conventional sol-gel techniques or other techniques well known to those skilled in nanoscience.

Monolithic polycrystalline composite materials according to the present invention are prepared by heating the packed, aligned and filled Single-Crystal Particle array to a temperature at which solid state diffusion between the nanoparticles and the Single-Crystal Particles occurs, until the Single-Crystal Particles of the array are bonded together. To obtain a level of solid state diffusion sufficient to bind together adjacent particles, a temperature above about half of the melting temperature is required, which is most generally in the range 200° C. to 2000° C. The temperature range selected will depend upon the material being bonded, but can be readily determined by those of ordinary skill in the art without undue experimentation within the defined range. For example, a temperature up to 2000° C. is suitable for ceramic oxides. Temperatures as low as 200° C. can be used to sinter and grow as grains materials such as fluorides. Temperatures even as low as 150° C. may be used, but with high pressure (e.g., on the order of gigapascals) to sinter materials that densify at high temperatures.

To induce grain boundary mobility, a temperature higher than that employed for sintering is required. For example, the conditions used for processing polycrystalline ceramics may require a temperature between 1000° C. and 1500° C. Conventional crystal growth methods typically will require much higher temperatures to melt oxides to single phase liquids. The present invention does not melt the material, but can, in some cases, form a liquid phase that coexists with the solid phase and thus, makes the material partially molten (liquid phase sintering). For example, lead oxide can be used to dissolve PZT and recrystallize it onto the seed Single-Crystal Particles. Other liquid phases can be envisioned, as long as their melting temperature is below that of the seed crystals and nutrient, and they can dissolve and recrystallize the nutrient and redeposit it onto the seed Single-Crystal Particles. In some cases, it is desirable to densify the entire structure so that there are no pores therein, and then let the Single-Crystal Particles grow through consumption of the nutrient by solid state processes (i.e., no liquid phase, but rather solid phase, sintering), or even by using a liquid phase. In other circumstances, the material may densify while the grains are growing, that is, the porosity disappears as the Single-Crystal Particles grow. It should be noted that the nutrient nanoparticles can differ compositionally from the seeds, e.g., the seeds can be strontium titanate cubes while the nutrient nanoparticles are PZT. Or, the seeds can be PZT and the nutrient nanoparticles can be lead magnesium niobate doped with lead titanate. These are just two examples of how the seeds and the nutrient nanoparticles can differ compositionally.

No matter how the polycrystalline material is formed, the preparation steps may be repeated to form a polycrystalline material having multiple layers of aligned cube-shaped particles. The resulting material is essentially a three-dimensional object with one, two, or three dimensional alignment of Single-Crystal Particles within.

The preparation of a polycrystalline array with one-dimensional alignment is shown in FIG. 1. Single-Crystal Particles 12 are aligned in one crystallographic direction, i.e., normal to the plane of surface 14. The crystallographic orientation of the particles in the other two-dimensions is completely randomized. For purposes of illustration, particles 12 are PZT Single-Crystal Particles, deposited on a flat substrate, which can be any type of polymer material such as Mylar™ or any type of metal such as platinum or any type of ceramic such as alumina. An adhesive (any kind) can be used to anchor the particles down, or even the surface tension of residual processing liquid, such as water, can accomplish this task. Voids 16 between the particles 12 are then filled with PZT nanoparticles 18. The nanoparticles can be prepared by the method disclosed by Das et al., "Low Temperature Preparation of Nano-crystalline Lead Zirconate Titanate Using Triethanolamine," (J. Am. Ceram. Soc.), 81(12), 3357–60 (1998). The assembly 20 is then heated t a temperature of 1200° C. for 2 hours, resulting in growth of the Single-Crystal Particles 12 by consumption of the nanoparticles 18 until impingement of adjacent grain boundaries 22 occurs. This produces a polycrystalline material 24 consisting of piezoelectric Single-Crystal Particles aligned in one crystallographic direction but producing a net Single-Crystal-Like piezoelectric effect.

Figure 2:
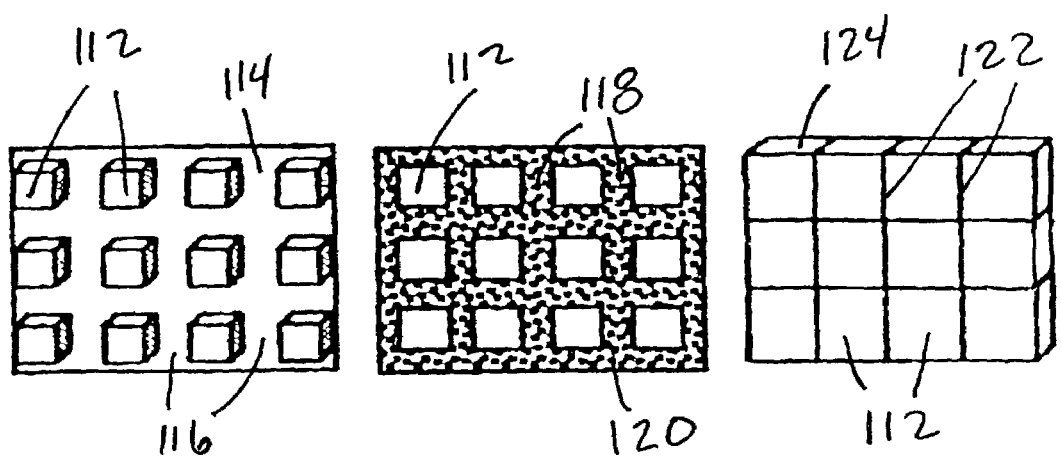
FIG. 2 Depicts the preparation of a polycrystalline composite material according to another embodiment of the present invention, wherein the individual cube-shaped Single-Crystal Particles are aligned in three crystallographic directions.

The preparation of a polycrystalline material 124 consisting of cubic Single-Crystal Particles 112 aligned in all three crystallographic directions is shown in FIG. 2. As in FIG. 1, the particles 112 are aligned in one crystallographic direction normal to the plane of surface 114. However, the particles, again PZT cubes, have been aligned three-dimensionally by being passed through a photomask such as those used in semiconductor manufacturing (not shown). The voids 116 between the Single-Crystal Particles 112 are again filled with PZT nanoparticles 118 and the assembly 120 is again heated at 1200° C. for 2 hours to obtain growth of the Single-Crystal Particles by consumption of the nanoparticles until impingement of adjacent grain boundaries 122 occurs. However, because of the three-dimensional alignment, exceptionally low grain boundary angles are obtained between individual Single-Crystal Particles, significantly enhancing the net Single-Crystal-Like behavior in the polycrystalline material 124.

A polymer binder can be substituted for the nanoparticles 18 or 118 to obtain a polymer-ceramic composite that exhibits a net Single-Crystal-Like effect due to the oriented Single Crystal Particles. Powder particles of polymer may be employed, which are then heated to melt or sinter the polymer powder to form a binder bonding together the Single-Crystal Particles. Or a solvent solution of polymer may be used to fill the void between the Single-Crystal Particles, which is then heated to evaporate the solvent and form a polymer binder bonding together the individual Single-Crystal Particles. The Single-Crystal Particles may also be packed and aligned onto the surface of an adhesive-coated polymer film or embedded into the surface of molten melted polymer film.

When a polymer binder is employed, the net Single-Crystal-Like effect is obtained independent of the polymer properties. Essentially any thermoplastic or thermosetting polymer may be used as the polymer binder, as well as any polymer that is capable of being sintered to form a binder bonding the Single-Crystal Particles together. Because the net Single-Crystal-Like effect is independent of the polymer properties, the polymer is instead chosen for the end use property desired for the polycrystalline composite. Thus, the polymer can be chosen as a passive component (e.g., a structural polymer can provide strength to a composite comprised of electro-optical Single Crystal Particles for use as an optical switch) and as an active component (e.g., an electrostrictive polymer can be used for a a composite comprised of piezoelectric Single Crystal Particles for an actuator). For instance, a polymer capable of forming a flexible film, such as poly(urethane), poly(vinylidene fluoride), and the like, may be chosen as a matrix in which piezoelectric Single-Crystal Particles can be packed and aligned to form a transducer useful to make a speaker having a micron-dimensioned thickness capable of being rolled up and applied as a film. Polymers may also be chosen for end-use properties such as rigidity, impact-resistance, heat resistance, cold resistance, optical transparency, electrical resistivity, and the like.

It will thus be appreciated that the present invention can be extended to essentially any present and future end-use for a single crystal. Essentially any Single-Crystal Particle having utility in a mechanical, electronic, electromechanical, optical or magnetic end-use application can be employed in the present invention to produce a polycrystalline composite material of macroscopic dimensions having the same utility as a single crystal. In addition to the piezoelectric applications for speakers and microphones discussed above, piezoelectric materials are also widely used in transducers, in general, as well as in dynamic random access memories (DRAMs), decoupling capacitors, acoustic sensors, optical filters, actuators and modulators. Polycrystalline composite replacements for the single crystals used in laser and photon detectors can also be prepared. Optical shutters can be prepared using polycrystalline composites of PLZT, which turns opaque black upon the application of a voltage.

Doped semiconductors for microelectronics can be prepared using Single-Crystal Particles of silicon can be doped to be p- or n-type semiconductors. Photorefractive materials for optical switching and memory storage can be prepared using oriented Single-Crystal Particles of Rh-doped barium titanate. Optical lasers can be prepared using oriented Single-Crystal Particles of doped sapphire.

The following non-limiting example set forth hereinbelow illustrates certain aspects of the invention. All parts and percentages are by weight unless otherwise noted and all temperatures are in degrees Celsius. The stoichiometric values for the Single-Crystal Particle materials are approximate.

EXAMPLE

Preparation of PZT Single-Crystal Particle Array

Materials. All water used was de-ionized water purified using a MILLIPORE system. Nitric acid and sodium hydroxide were of analytical grade and directly used as received. Sodium polyacrylate have a weight-average molecular weight of 5100 daltons was purchased from Fluka Co. and used as received. Cube-shaped PZT particles were synthesized using a PARR pressure reactor according to the procedure disclosed by Cho, et al. "Hydrothermal Synthesis of Acircular Lead Zirconate Titanate (PZT)," *J. Cryst. Growth*, 226 (2–3), 313–326 (2001).

The PZT particle size distribution was measured using a MICROTRAC 9200 Full Range Analyzer (Leeds & Northrup). Particle morphology was determined using Field Emission Scanning Electron Microscopy (FESEM, LEO Electron Microscopy, Inc.).

The particle size analysis indicated that the PZT particles had a mean volume diameter of 4.45 microns, a mean number diameter of 3.32 microns and a standard deviation of 1.37. The calculated specific surface area of the PZT particles was 1.51 $m^2/g$. The PZT particles were dispersed into water and ultrasonicated for two minutes before being loaded into the particle size analyzer.

An electroacoustic analyzer (MATEC 8000, Matec Applied Sciences) was used to measure the Zeta potential of the PZT particles suspension, the pH of which was adjusted using 0.01 M $HNO_3$ and 0.01 M NaOH as titrants. After each addition of base or acid, fifteen minutes was allowed for the entire solution to equilibrate to a stable pH value. Several aqueous sodium polyacrylate solutions with different concentrations were prepared under vigorous stirring under room temperature. The polymer solutions, used soon after the polymer completely dissolved, were added to a suspension of 22 g PZT particles into 220 mL water for obtaining the function of the Zeta potential against polymer concentration. A suspension containing 22 g PZT powder and 27 g sodium polyacrylate powder dispersed in 220 mL water was vigorously stirred for four hours and then used for the Zeta potential measurement for obtaining the function of the Zeta potential again pH.

4 g of PZT powder and 4.92 g of sodium polyacrylate powder were added to 40 mL water and vigorously stirred for four hours. The suspension was divided into several portions and the pH of each portion was titrated using fresh ammonium hydroxide solution ($NH_3$, 28.5 w/w %, Fisher Scientific) and 0.01 M $HNO_3$. Suspensions of pH 3.6, 6.0, 8.4, 9.7 and 11.0, measured with a small pH-meter (Fisher Scientific, Model 505 MP), were transferred onto glass slides separately. The surfaces of each glass slide were first washed with alcohol and acetone and finally washed with water. The cleaned glass slides were carefully dried and checked with an optical microscope to ensure that there was not any dust contaminants on the surfaces. Samples were air dried under a hood and covered during the drying process to prevent dust contamination. Samples made from suspensions of polymer were also prepared for comparison to samples containing polymer.

Polymer suspension samples having a pH of nine and above formed one-dimensional particle arrays. The particles were well-arranged, forming a planar array of very smooth surfaces, with virtually no defects observed. The particle array was of homogenous thickness, about 6.5 microns thick. The high degree of alignment improves electromechanical performance, including piezoelectricity, among other properties.

The foregoing example and description of the preferred embodiment should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

What is claimed is:

1. A polycrystalline material comprising a plurality of single-crystal particles having self-orientation and bonded together to fix their orientation along at least one crystallographic direction, wherein said single crystal particles fill greater than about 65% of the space occupied by the gross dimensions of the material.

2. The polycrystalline material of claim 1, wherein said single crystal particles are aligned in two dimensions.

3. The polycrystalline material of claim 1, wherein said single crystal particles are aligned in three dimensions.

4. The polycrystalline material of claim 1, wherein said single crystal particles have space filling morphologies.

5. The polycrystalline material of claim 4, wherein said single crystal particles have a morphology selected from the group consisting of triangular-, square-, rectangular- and hexagonal-platelets.

6. The polycrystalline material of claim 1, wherein said single crystal particles have a morphology selected from the group consisting of tetrahedral, cube, and octahedron.

7. The polycrystalline material of claim 1, wherein said single crystal particles are particles of a material with crystallographic-direction-dependent properties.

8. The polycrystalline material of claim 7, wherein said single crystal particles are particles of a piezoelectric material.

9. The polycrystalline material of claim 8, wherein said piezoelectric material is a lead zirconium titanate.

10. The polycrystalline material of claim 7, wherein said single crystal particles are particles of a material selected from the group consisting of lead zinc niobate doped with lead titanate, lead magnesium niobate doped with lead titanate, sodium potassium bismuth titanate doped with barium and zirconium, bismuth ferrite doped with lead titanate, doped alumina, yttrium aluminum garnet, lead lanthanum zirconate titanate, zinc oxide, rhodium doped barium titanate, gallium nitride, cadmium sulphide, titania, calcium fluoride, rare earth doped lanthanum chlorides, rare earth doped lanthanum fluorides, yttrium orthophosphate, terbium phosphate, manganese zinc ferrite, strontium ferrite, barium ferrite, yttrium iron garnet, samarium cobalt alloys and neodymium-iron-boron alloys.

11. The polycrystalline material of claim 1, comprising a monolithic agglomerate of said single crystal particles with low-angle grain boundaries therebetween bonded together by solid state diffusion.

12. A polycrystalline material comprising a plurality of single-crystal particles having self-orientation and bonded together to fix their orientation along at least one crystallographic direction, wherein said single crystal particles are bonded together by a polymer phase.

13. The polycrystalline material of claim 12, wherein said single crystal particles are packed and aligned on the surface of a polymer film.

14. The polycrystalline material of claim 13, wherein said polymer film is a flexible polymer film.

15. The polycrystalline material of claim 14, wherein said flexible polymer film is a poly(urethane) or poly(vinylidene fluoride) film.

16. The polycrystalline material of claim 12, wherein said single crystal particles are packed and aligned within a sintered or solvent-cast polymer binder.

17. The material of claim 1 wherein the thickness of said polycrystalline material is less than about 2 microns.

18. The material of claim 17 wherein the thickness of said polycrystalline material is between 10 nm and 2 μm.

19. The material of claim 1 wherein said single crystal particles fill greater than about 80% of the space occupied by the gross dimensions of the material.

20. The material of claim 19 wherein said single crystal particles fill greater than about 90% of the space occupied by the gross dimensions of the material.

21. The polycrystalline material of claim 4, wherein said single crystal particles have a morphology selected from the group consisting of triangular-, square-, rectangular-, and hexagonal prisms.

22. The polycrystalline material of claim 4, wherein said single crystal particles have a morphology selected from the group consisting of triangular-, square-, rectangular- hexagonal- and cylindrical fibers.

23. The polycrystalline material of claim 1, wherein said single crystal particles are bonded together by a polymer phase.

24. The polycrystalline material of claim 12, wherein said single crystal particles have space filling morphologies.

25. The polycrystalline material of claim 12, wherein said single crystal particles are particles of a material with crystallographic-direction-dependent properties.

26. The polycrystalline material of claim 25, wherein said material is a lead zirconium titanate.

27. The material of claim 12 wherein the thickness of said polycrystalline material is less than about 2 microns.

28. The polycrystalline material of claim 12, comprising a monolithic agglomerate of said single crystal particles with low-angle grain boundaries therebetween bonded together by solid state diffusion.

29. The polycrystalline material of claim 12, wherein said single crystal particles fill greater than about 65% of the space occupied by the gross dimensions of the material.

30. A polycrystalline material comprising a plurality of single crystal particles having self-orientation and bonded together to fix their orientation along at least one crystallographic direction, wherein the thickness of said polycrystalline material is less than about 2 microns.

31. The material of claim 30, wherein the thickness of said polycrystalline material is between 10 nm and 2 μm.

32. The polycrystalline material of claim 30, wherein said single crystal particles are bonded together by a polymer phase.

33. The polycrystalline material of claim 30, wherein said single crystal particles have space filling morphologies.

34. The polycrystalline material of claim 30, wherein said single crystal particles are particles of a material with crystallographic-direction-dependent properties.

35. A polycrystalline material comprising a plurality of single crystal particles having self-orientation and bonded together to fix their orientation along at least one crystallographic direction, wherein the single crystal particles consist of lead zirconium titanate.

36. The polycrystalline material of claim 35, comprising a monolithic agglomerate of said lead zirconium titanate particles with low-angle grain boundaries there-between bonded together by solid state diffusion.

37. The polycrystalline material of claim 35, wherein said lead zirconium titanate particles are bonded together by a polymer phase.

* * * * *